UNITED STATES PATENT OFFICE.

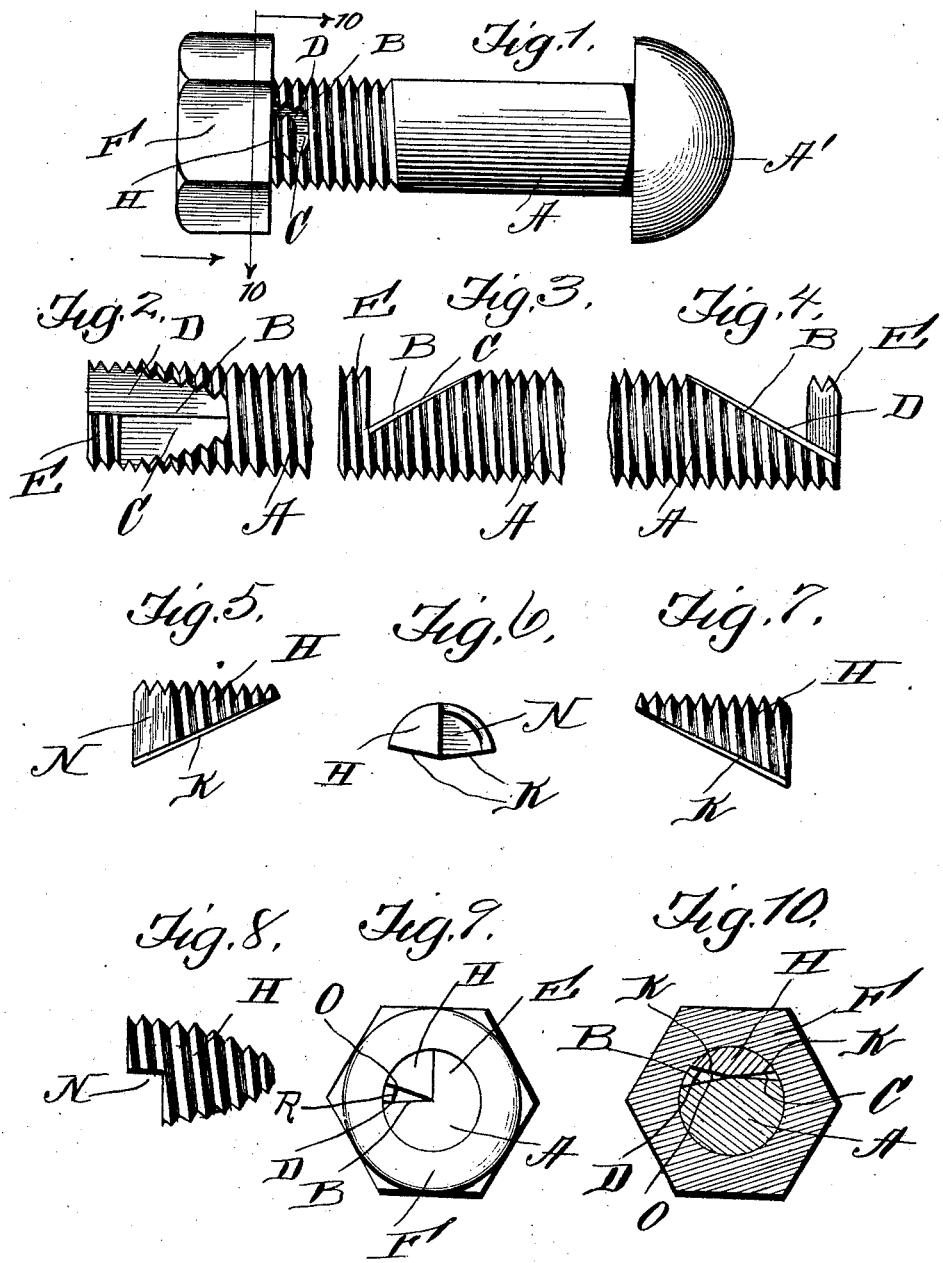

WILLIAM H. HARLOW, OF BROOKLYN, NEW YORK.

NUT-LOCK.

No. 830,589. Specification of Letters Patent. Patented Sept. 11, 1906.

Application filed April 17, 1906. Serial No. 312,279.

*To all whom it may concern:*

Be it known that I, WILLIAM H. HARLOW, a citizen of the United States, residing at Brooklyn, in the county of Kings and State of New York, have invented certain new and useful Improvements in Nut or Bolt Locks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in nut and bolt locks, and the object of the invention is to produce a bolt having a detachable section which is provided with one inclined face and the convexed portion having series of segment threads, said section being adapted to rock to cause the sectional threads to engage the usual threads of a nut, thereby making it impossible to unscrew a nut without first tilting the removable piece which normally binds against the nut to hold the same in place.

My invention comprises various other details of construction and combinations and arrangements of parts, which will be hereinafter fully described and then specifically defined in the appended claims.

I illustrate my invention in the accompanying drawings, in which—

Figure 1 is a view showing the nut screwed upon the bolt and held in a locked relation. Fig. 2 is a side elevation of the bolt with the locking-piece removed. Fig. 3 is an edge view of the bolt. Fig. 4 is an edge view of the bolt from the opposite side shown in Fig. 3. Fig. 5 is a side elevation of the removable locking-plate. Fig. 6 is an end view of the locking-plate. Fig. 7 is a view of the locking-plate opposite the side shown in Fig. 5. Fig. 8 is a top plan view of the locking-plate. Fig. 9 is an end view of the bolt and nut locked thereon, and Fig. 10 is a cross-sectional view showing one of the angled surfaces of the bolt.

Reference now being had to the details of the drawings by letter, A designates a bolt having a head A' and a shank portion which is threaded. Said shank portion has a cutaway part B, the surface of which has two angled faces (designated by letters C and D, respectively) and a projecting portion E at the end forming a shoulder.

F designates a nut of the usual construction having threads adapted to receive the threads of the bolt.

H designates a locking-plate which has an inclined surface K, as shown clearly in the sectional view of the drawings, and is adapted to rest in the recessed portion of the bolt and adapted to rock upon the inclined surfaces thereof. Said locking-plate has a notch N formed in one end thereof and adapted to receive the part E, which is integral with the bolt and designed to limit the movement of said plate in one direction.

It will be noted by reference to Fig. 8 of the drawings that there is a slight wedge-shaped space O intermediate one of the inclined surfaces in the recessed portion of the bolt and the adjacent edge of the locking-plate, and in which a wedge-shaped object R may be inserted for the purpose of preventing the plate from rocking when it is desired to unscrew the nut.

In applying the nut the shoulder of the locking-plate coming in contact with the projecting part E will cause the threads upon the bolt and the locking-plate to be in registration; but in the event of it being desired to loosen the nut if the wedge-shaped strip is withdrawn from the similar-shaped space O said locking-plate will be caused to rock and the segment-threads thereon will bear against the threads of the nut with sufficient frictional force to prevent the nut from being loosened. It will be understood, therefore, that when it is desired to remove the nut the wedge-shaped member is inserted in said space O, which will prevent the plate from rocking, and thereby allowing the nut to loosen or be removed from the bolt.

What I claim is—

1. A nut-lock comprising a bolt having a recessed end, a locking-plate having a recess in one end and provided with a convexed threaded surface, a portion of said plate having faces at angles to each other adapted to seat upon the recess in the bolt, means for holding the plate from rocking, an integral portion E on the bolt designed to receive the recessed portion of said plate and adapted to hold said latter upon the bolt.

2. A nut-lock comprising a bolt having a recessed end, a locking-plate provided with a convexed threaded surface, a portion of said plate having faces at angles to each other adapted to seat upon the recess in the bolt, means for holding the plate from rocking, an integral portion E of the nut rising from the bottom of said recess and having threaded surface, said locking-plate having a recess in the edge thereof, adapted to receive said integral portion E upon the bolt, as set forth.

In testimony whereof I have hereunto affixed my signature in the presence of two witnesses.

WILLIAM H. HARLOW.

Witnesses:
   WILLIAM A. MILLER,
   CHARLES W. HOGAN.